E. RATH.
Perfume-Fountain.
No. 160,713.    Patented March 9, 1875.
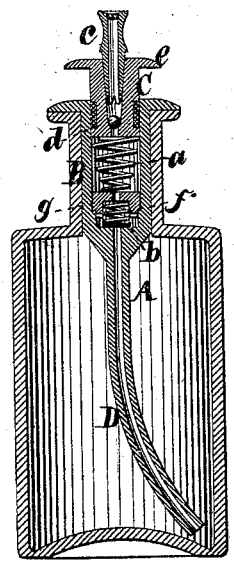
Witnesses.
Emil Bilhueber.
Chas. Wahlers.
Inventor.
Emil Rath
pr
Van Santvoord & Hauff
Attys

UNITED STATES PATENT OFFICE.

EMIL RATH, OF HOBOKEN, NEW JERSEY.

IMPROVEMENT IN PERFUME-FOUNTAINS.

Specification forming part of Letters Patent No. 160,713, dated March 9, 1875; application filed January 29, 1875.

*To all whom it may concern:*

Be it known that I, EMIL RATH, of Hoboken, in the county of Hudson and State of New Jersey, have invented a certain new and useful Improvement in Perfume-Fountains, of which the following is a specification:

This invention is illustrated in the accompanying drawing, which represents a central section.

This invention consists in combining, with a perfume-bottle, a double-acting pump, the barrel of which is secured air-tight in the neck of the bottle, and the plunger of which is provided with a button or finger-piece, by which it can be depressed, while it is subjected to the action of a spring which forces the same up, a suitable suction-pipe being made to extend from the pump-barrel down into the bottle, in such a manner, that by alternately depressing the plunger and then allowing it to rise by the action of its spring, the liquid contained in the bottle is sucked into the barrel, and then forced out in fine jets through a rose-head secured to the plunger.

In the drawing, the letter A designates a bottle or flagon, in the neck of which is firmly secured a barrel, B, which is bored out to receive the plunger C. From the bottom of the barrel B extends the suction-pipe D, and the plunger C is subjected to the action of a spring, $a$, which has a tendency to force the same up. On the bottom of the barrel is situated the foot-valve $b$, and the plunger is bored out and provided with a discharge-spout, $c$, the passage to said spout being furnished with a valve, $d$, which opens outward. The spout is by preference made in the form of a rose-head. On the plunger is formed a button or finger-piece, $e$, which serves to depress the same against the action of its spring.

When the plunger is first depressed the foot-valve closes, and the air contained in the barrel B is expelled through the valve $d$ and the spout $c$. As the barrel is released and allowed to follow the action of its spring $a$, the valve $d$ closes and a portion of the liquid contained in the bottle is sucked into the barrel, and, if the plunger is then again depressed, the liquid contained in the barrel is expelled in fine jets through the spout. A connecting pin or lug, or other suitable stop, readily suggestive to a mechanic, should operate in connection with the plunger, to prevent it from being ejected out of its seat by the action of the spring.

The valve $b$ is held down on its seat by a weak spring, $f$, which is contained in a chamber formed in the bottom of the barrel. For the purpose of forming this chamber a plug, $g$, is secured in the barrel, and this plug is bored out to allow the liquid to pass up, and it is provided with a recess for the reception of the spring. The object of this spring is to keep the valve closed when the bottle or flagon is laid down or turned upside down.

What I claim as new, and desire to secure by Letters Patent, is—

A perfume-fountain composed of a bottle or flagon, A, having secured in its neck a barrel, B, in combination with the plunger C, suction-pipe D, spring $a$, valves $b$ $d$, button or finger-piece $e$, and spout $c$, all constructed and operating substantially as shown and described.

In testimony that I claim the foregoing I have hereunto set my hand and seal this 27th day of January, 1875.

EMIL RATH. [L. S.]

Witnesses:
 W. HAUFF,
 E. F. KASTENHUBER.